March 11, 1969  W. C. CARLTON  3,431,626
METHOD OF MAKING A RACKET FRAME
Filed June 13, 1966  Sheet 1 of 2

March 11, 1969 — W. C. CARLTON — 3,431,626
METHOD OF MAKING A RACKET FRAME
Filed June 13, 1966

United States Patent Office 3,431,626
Patented Mar. 11, 1969

3,431,626
METHOD OF MAKING A RACKET FRAME
William C. Carlton, Fitches Finchingfield, Essex, England
Filed June 13, 1966, Ser. No. 557,159
U.S. Cl. 29—423                                    8 Claims
Int. Cl. B23p 17/00; A63b 49/10

ABSTRACT OF THE DISCLOSURE

A method of making a frame for rackets, such as badminton, squash and tennis rackets, comprising inserting a strip of plastics material (which may be nylon) or a metal member, into a metal tube which is to form the main body of the frame. The plastics strip has spaced holes properly positioned to be concentric with the flanged apertures that are to be formed in the walls of the metal tube. The inner metal member likewise is provided with spaced holes. The assembly is bent into a loop, small holes are made in the walls of the metal tube, then the metal surroundng said small holes is punched and bent to make larger apertures with inturned flanges that are suitable for stringing. These flanges project within the holes in the plastic strip or in the inner metal member. The plastics strip or the inner metal member acts as a female die during said punching and bending. The metal tube is then hardened by a heat treatment. Heat removes the plastics strip from the interior of the metal tube, but the inner metal member remains within the metal tube.

---

This application is a companion to application Ser. No. 557,023 filed by me on June 13, 1966.

This invention relates to racket frames for rackets for use, for example, in badminton, tennis and squash, and to methods of manufacturing such racket frames.

In this specification the term "frame" means the looped portion of a racket within which the stringing is carried out, as distinct from the shaft of the racket which connects the frame to the handle; a "flanged aperture" is a hole and its surrounding metal, the inner edge of which has been turned through substantially 90° from its original position to create a smooth passage for the strings of the racket.

It has been proposed to make rackets having steel frames and also rackets having steel shafts, but the use of steel frames has met with some difficulties, especially due to the sharp edges of the steel cutting the strings, either during the stringing or in use of the racket. In the case of tennis rackets this difficulty has been alleviated by such methods as the use of auxiliary eyelets in the holes provided in the frame for the stringing, or the use of wire wound around the frame. However, such methods add considerably to the complexity and cost of manufacture of the racket, and in the case of badminton rackets, which must be very light, such methods are not suitable due to the associated increase in weight of the frame.

It is an object of this invention to provide a method of making a metal frame for a racket which can be made light enough to be acceptable as a top class badminton racket, and also to produce, by a similar technique but in appropriately different sizes and weights, improved forms of other types of racket frames, such as tennis and squash racket frames.

According to one feature of the invention there is provided a racket frame formed from a metal tube characterised in that the tubular frame has integral flanged apertures for the strings of the racket, the said flanges projecting towards the interior of said tube.

The invention is developed so that the tubular frame has recesses on its outside wall between the integral flanged apertures, said recesses receiving the stringing.

In one form of the invention the said tube is formed of a material which is malleable to enable said integral flanged apertures to be formed and to enable said tube to be formed into said frame, and said material is then hardened after said forming.

In another form of the invention the metal tube is made of a material which has an elongation, at least locally, such that the integral flanged apertures may be formed, and the said tube may be formed into a frame after any hardening treatment required by the said material has been completed.

According to another feature of the invention there is provided a method of manufacturing a racket frame comprising employing a metal tube for the frame of the racket characterised in that the material of said tube is malleable and comprising forming integral flanged apertures in said tube for the strings of the racket, said integral flanged apertures having flanges projecting towards the interior of said tube and forming said tube into said frame, in whatever order, and then hardening the material of said tube after the forming operations have been completed.

In yet another feature of the invention there is provided a method of manufacturing a racket frame comprising employing a metal tube for the frame of a racket characterised in that any hardening operations required are completed before forming integral flanged apertures in said tube for the strings of the racket, the said integral flanged apertures having flanges projecting towards the interior of said tube and forming said tube into a frame, either before, or after, said integral flanged apertures have been formed.

By way of example, to make a frame for a top class badminton racket the metal tube may have a wall thickness of between .012 of an inch and .014 of an inch (.305 mm./.355 mm.). The material of said tube is a steel having in its malleable state a 0.2% proof stress not exceeding 30 tons per square inch, and a maximum stress not exceeding 55 tons per square inch, but which can be hardened to a condition in which it has an 0.2% proof stress and a maximum stress of not less than 70 tons per square inch and, preferably, the maximum stress should not be less than 80 tons per square inch. Moreover, in its malleable state the steel has an elongation on 2 inches (50.8 mm.) of not less than 25%, while in its hardened state it has an elongation on 2 inches (50.8 mm.) of not more than 15%. The forming operations which will later be described for such a material being used will be completed when the material is in its malleable state and the frame is completed by hardening the material after the forming operations. Such a material is F.V. 520 (S), but the invention is not limited to this material. Any material having the above characteristics and is otherwise suitable, e.g. it must not be too brittle, may be used.

Alternatively, the metal tube may have a wall thickness of between .012 of an inch (.305 mm.) and .014 of an inch (.355 mm.) and be made of a material which has a 0.2% proof stress and maximum stress of not less than 70 tons per square inch, and the maximum stress preferably being not less than 80 tons per square inch, and having an elongation on 2 inches (50.8 mm.) of not more than 15% excepting locally where a local elongation of 25% may be obtained. If such a material is used the forming operations may be completed after hardening. An example of such a material is a suitable Maraging steel. Alternatively, with such a steel forming may be carried out before hardening occurs when the material is being "Maraged."

In explanation of the term "Maraging," this is a word coined from "martensite" and "age hardening." This new classification of steels is a high strength steel produced by the British firm Firth-Vickers Stainless Steels Limited and is a semi-austenitic or controlled transformation stainless steel of the precipitation hardening type suitable for stretch forming or shallow pressings. Transformation to martensite occurs during deformation. Other than iron (Fe) a Maraging steel may have a composition of C, 0.04 to 0.07; Si, 0.60 maximum; Mn, 0.80 to 1.80; Cr, 15.3 to 16.0; Ni, 5.0 to 5.8; Cu, 1.4 to 2.1; Mo, 1.2 to 2.0; and Ti, 0.05 to 0.15.

According to one method of the invention, which is especially suitable for the manufacture of badminton racket frames in which a light weight is required, the metal tube has inserted therein a strip of plastics material, such as nylon, having preformed suitably positioned and sized holes therein, prior to the flanging of the apertures in the metal frame. The holes in the plastics strip are larger than those required in the metal frame to accommodate the racket stringing, and are positioned to be concentric with said required apertures. During flanging of the apertures in the metal frame the plastic strip acts as a female die in a punching operation. The plastics strip may be removed by heating to melt the plastics material, for example, during a hardening process for the metal tube. Alternatively, the flanged apertures may be formed in the metal frame without the insertion of such a strip of plastics material.

In another method within the scope of the invention, which is more suitable for the manufacture of rackets which are required to be of a certain weight, and not as light as possible, for example, tennis and squash rackets, an inner metal member is provided within the metal tube of the racket frame. The inner metal member may be tubular or solid, or part tubular and part solid, and it may extend throughout substantially the whole metal tube or only a part of it. The inner metal member is provided with holes therein which are larger than those required in the outer metal tube and are positioned to be concentric with said required apertures. During a forming operation in which the flanged apertures in the outer metal tube are formed, the inner metal member serves as a female die, the arrangement being such that the flanges of the apertures in the outer metal tube extend within the larger holes in the inner metal member. The inner metal member is not subsequently removed but forms a part of the finished racket and can be arranged to impart a desired weight and weight distribution to the racket. The inner metal member is made of a material which is malleable to enable it to be formed into the shape of the relevant part of the frame of the racket, and preferably the material of said inner metal member is hardenable coincidentally with the material of the metal tube, after the frame and the flanged apertures have been formed. Alternatively, the material of the inner metal member may be such that substantially no hardening or deterioration occurs during the hardening of the metal tube, or both tubes may be made of a material which requires no hardening subsequent to the forming operations.

In order that the invention may be clearly understood and readily carried into effect it will now be more fully described with reference to the accompanying drawings, in which.

Referring initially to FIGURES 1 to 5 of the drawings, the invention will be described, by way of example, as applied to embodiments of a badminton racket. The badminton racket shown in FIGURE 1 comprises a frame 1 formed from a metal tube in a manner which will be described in greater detail hereinafter in connection with FIGURES 3 to 5. The racket of FIGURE 1 also comprises a metal shaft 2 which connects the frame 1 to a handle 3, which may be made from moulded plastics material or may be of any other suitable form. The shaft 2, in this embodiment, is a single tubular shaft which may be separately formed from the frame 1 and secured, such as by welding, to the two ends of the tube forming said frame 1. Alternatively, the shaft 2 may be constituted by an extension of one end of said tube forming the frame 1, the other end of said tube being welded to said one end. The stringing for the racket is not shown.

Figure 2:
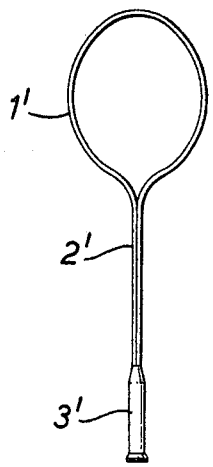
FIGURE 2 is an elevation on a reduced scale of a slightly different form of badminton racket, the stringing being omitted.

In an alternative construction, illustrated in FIGURE 2, in which references 1', 2' and 3' are used for the frame, shaft and handle respectively of the racket, both ends of a metal tube forming the frame 1' are extended to form the shaft 2' so that the shaft 2' is a double tube shaft. The two tubes of the shaft 2' may be secured together along their lengths, such as by welding and the handle 3' may be moulded or otherwise formed over the ends of the two tubes.

Figure 1:
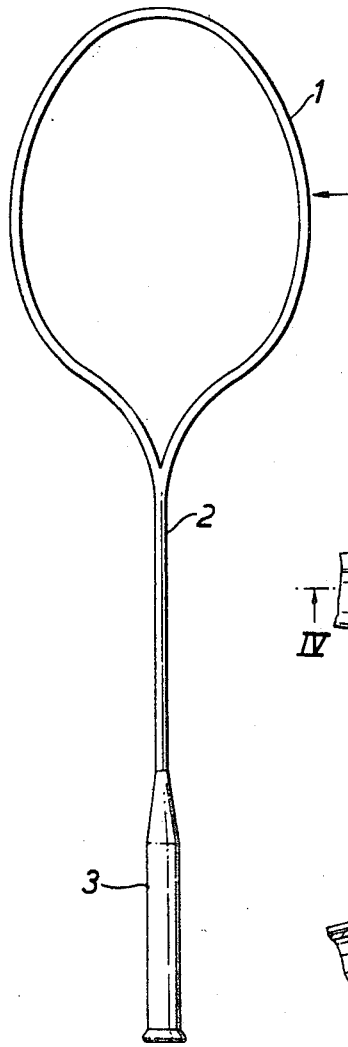
FIGURE 1 is an elevation of a badminton racket made in accordance with the invention, the stringing being omitted.
Figure 3:
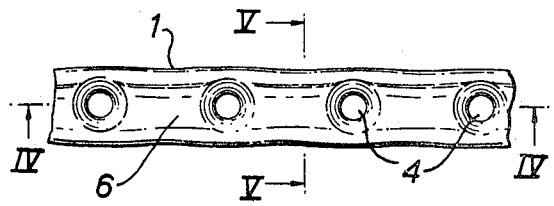
FIGURE 3 is a fragmentary side elevation of the racket frame of either FIGURE 1 or FIGURE 2.
Figure 4:
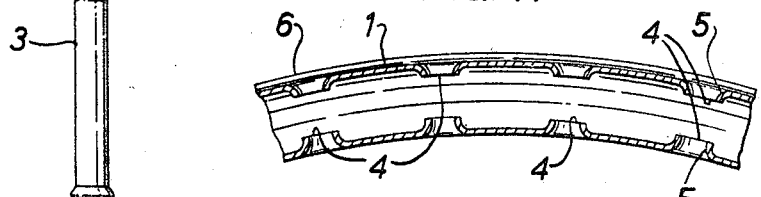
FIGURE 4 is a longitudinal section, on line IV—IV of FIGURE 3, through a part of the tube from which the racket frame is made.
Figure 5:
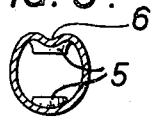
FIGURE 5 is a cross section on line V—V of FIGURE 3, on the same scale as FIGURE 3.

The construction of the frames of the racket in FIGURES 1 and 2 is the same and this will now be described in greater detail with reference to FIGURES 3, 4 and 5. The metal tube of which the frame 1 (or 1') is made is provided with a plurality of holes 4 therethrough positioned to accommodate the required strings of the racket. These holes, and their surrounding metal, are referred to as apertures. The apertures 4 are bounded by flanges 5 which can be seen most clearly in FIGURES 4 and 5 and which project towards the interior of the tube and are integral with the tube. Because all the flanges project towards the interior of the tube smooth surfaces are provided for the strings both on the inside and outside of the racket frame. This greatly increases the life of the strings. In the particular embodiments illustrated, the outer periphery of the frame 1, indicated by the arrow in FIGURE 1, is provided with a recess or groove 6, visible in FIGURES 3, 4 and 5, to accommodate the strings stretched between the apertures 4.

Although in the particular embodiments described the tube forming the frame 1 or 1' is shown to be predominantly of circular bore (apart from the groove 6) as an alternative the bore may be elliptical, or otherwise suitably shaped.

In manufacturing the frame of the racket described with reference to FIGURES 1 to 5 a metal tube, for example, of a steel (having the characteristics hereinbefore stated as suitable for working in a malleable state) has whilst in its malleable state the apertures 4 and the grooves 6 formed in it by making small holes and then formed to enlarge the holes and form the inwardly projecting flanges 5 and grooves 6. Whilst still in its malleable state the tube is formed into a loop. It is preferable, but not essential, that the forming should be done in the above-described order. The frame 1 or 1' with the flanged apertures 4 formed therein is subsequently hardened by a suitable hardening process, for example, by heat treatment. Alternatively, the material selected for the frame may have an elongation after hardening adequate to permit the necessary forming operations and subsequent hardening then becomes unnecessary.

In a modified method of manufacturing the racket, a strip of plastics material, such as nylon, is inserted into the metal tube, said plastics strip being of such a thickness as to be a close sliding fit with respect to the wall portions of the metal tube which are to be apertured. The plastics strip has therein holes positioned to be concentric with the required apertures in the metal tube, but larger than said required apertures. The plastics strip acts as a female die during the punching operation forming the flanged apertures 4 in the metal tube, the flanges 5 projecting within the apertures in the plastics strip. The plastics strip may subsequently be removed by heating to melt the plastics strip. By way of example, said plastics strip may be removed during a hardening process for the metal tube. FIGURE 4 and 5 show the metal tube after the plastics strip has been removed by heat as aforesaid.

Although the embodiments of FIGURES 1 to 5 have been particularly described with respect to the manufacture of badminton rackets, a similar method and construction may be employed for other rackets such as tennis and squash rackets with a suitable adaptation of size and weight of the racket frame.

The invention will now be described with reference to the embodiments of FIGURES 6 to 11 as applied to a squash racket frame.

Figure 6:
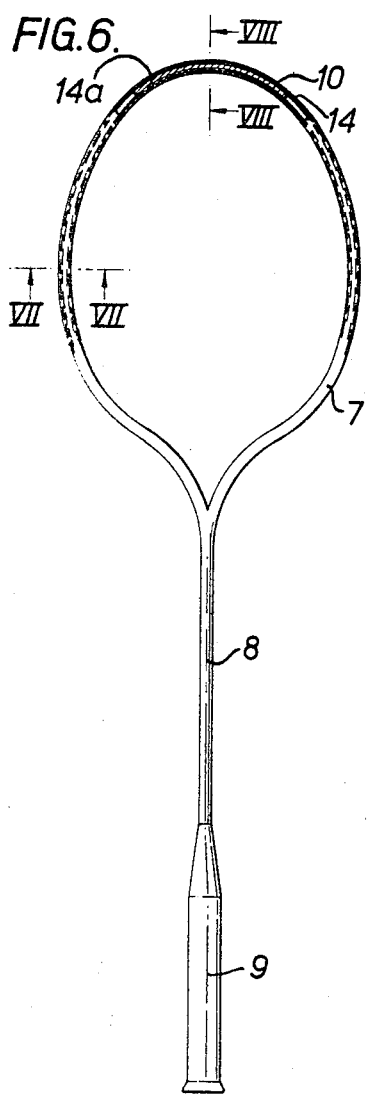
FIGURE 6 is an elevation of a racket constituting another embodiment of the invention, omitting the stringing.
Figure 7:
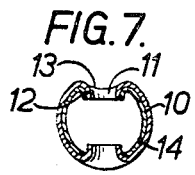
FIGURES 7 and 8 are enlarged cross sections on the lines VII—VII and VIII—VIII respectively of the racket of FIGURE 6.
Figure 8:
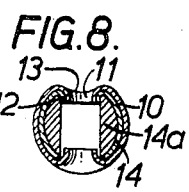

In the embodiment of FIGURES 6 to 8 the squash racket comprises a frame 7, a shaft 8 and a handle 9. The handle 9 may be a moulded plastics one or may be of other suitable form. The shaft 8 may be in the form of a metal tube which may be separate from the frame of the racket but secured thereto or may be an extension of a metal tube forming a part of the frame 7 of the racket. The frame 7 comprises a metal tube 10 formed with apertures 11 having inwardly projecting flanges 12 as previously described with reference to the embodiments of FIGURES 1 to 5. Moreover, the outer periphery of the metal tube 10 is provided with a recess or groove 13 similar to the groove 6 of the previously described embodiments. In this particular embodiment of the invention, in addition to the metal tube 10, the frame comprises an inner metal member 14 desposed within the metal tube 10 and having holes therein concentric with the apertures in the metal tube 10 but larger than the last mentioned apertures so that the flanges 12 project within the holes in the inner metal member 14. In the embodiment of FIGURES 6 to 8 the inner metal member 14 comprises a tubular member with a solid insert 14a in a portion of its length. This portion of the length of the inner metal member is arranged to be at the remote end of the frame 7 from the shaft 8, and thus imparts additional weight, if required, to said remote end. The particular length and density of the solid insert 14a may be chosen in accordance with the desired weight of the racket.

In manufacturing the racket of FIGURES 6 to 8, the inner metal member 14, formed with holes therethrough as described, is inserted in the metal tube 10, in which it preferably has a sliding fit. Preferably both the metal tube 10 and the inner metal member 14, which includes the solid insert 14a, are made of a steel having the characteristics defined hereinbefore, although other materials with suitable properties may be employed. The metal tube 10 containing the inner metal member 14 correctly positioned therein is then formed into a loop to provide the frame of the racket, the inner metal member 14 taking up the same configuration in the part of the frame in which it is situated. Small holes are then made in the metal tube 10 in appropriate positions for the racket strings, and apertures having flanges 15 are then formed, employing a punching operation during which the inner metal member 14, where this is provided, acts as a female die. Alternatively, the loop may be made after the apertures are flanged. Subsequently, the metal tube 10 of the frame is hardened by any suitable process, for example, by heat treatment. Depending upon the material of the inner metal member 14 this may be hardened coincidentally, or may remain in its malleable state.

Figure 9:
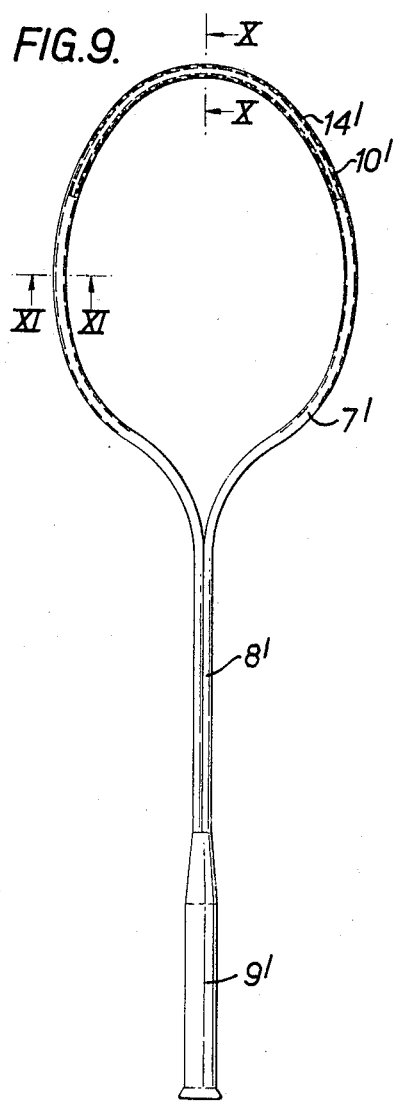
FIGURE 9 is an elevation of a racket in accordance with a further embodiment of the invention.
Figures 10, 11:
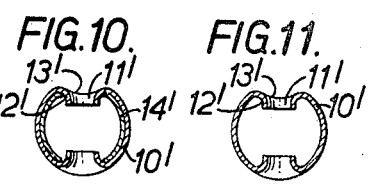
FIGURES 10 and 11 are enlarged cross sections on the lines X—X and XI—XI respectively of the racket of FIGURE 9.

In the embodiment of FIGURES 9 to 11 like reference numerals, but primed, are employed to indicate parts corresponding to those in the embodiment of FIGURES 6 to 8. The embodiment of FIGURES 9 to 11 differs from that of FIGURES 6 to 8 in the length and form of the inner metal member 14. More precisely the inner metal member 14' is a tubular member without a solid insert, and is of shorter length than the inner metal member 14. This can be seen in FIGURE 9 in which the outline of the inner metal member 14' is shown dotted. The frame of the racket shown in FIGURE 9 can be manufactured in a manner similar to that already described with reference to the frame of the racket in FIGURE 6.

The shaft 8' of the racket of FIGURE 9 is a double tubular one as shown, formed by a continuation of the ends of the metal tube 10'. The handle 9' is formed over the ends of said continuations, and may be a moulded plastics one or of other suitable form.

Although the invention has ben described with reference to particular embodiments thereof, these may be modified in various ways without departing from the scope of the invention. By way of example, the embodiments of FIGURES 6 and 9 may be varied by varying the lengths of the inner metal members 14, 14'. Moreover, the inner metal member in either of these embodiments may be replaced by a solid member, or the solid insert in the embodiment of FIGURE 6 may be provided throughout the whole of the extent of the inner metal member, or any other suitable part thereof.

What I claim is:

1. A method of making a racket frame, with integral flange apertures suitable for stringing, from a tube of suitable metal comprising inserting a strip of plastics material into a metal tube before the formation of said apertures, said strip having spaced holes therethrough properly positioned to be concentric with the required flange apertures, forming the assembly into a loop, making small holes in the metal tube, simultaneously punching and bending the metal surrounding said small holes to form larger apertures with inturned flanges that are suitable for stringing, said strip acting as a female die during said punching and bending operations, said inturned flanges projecting within the spaced holes in the plastics strip.

2. The invention defined in claim 1, wherein the metal tube, after the aforesaid operations, is hardened by a heat treatment.

3. The invention defined in claim 1, wherein the plastics strip is of nylon and is removed from the interior of the metal tube by heating the tube.

4. The invention defined in claim 1, wherein the plastics strip is of such dimensions as to have a close sliding fit within the metal tube, and has holes which are substantially larger than said required flanged apertures.

5. A method of making a racket frame from a metal tube comprising inserting an inner metal member within the metal tube, said inner metal member having spaced holes therein positioned to be concentric with the required flanged apertures in the metal tube, but larger than said required apertures, and punching said required flanged apertures in said metal tube and bending the metal at the same time so that the required flanged apertures extend within the holes in said inner metal member.

6. The invention defined in claim 5, said inner metal member acting as a female die during the punching operation that forms said flanged apertures.

7. The invention defined in claim 5, wherein the inner metal member is tubular and is substantially shorter than the over-all length of the metal tube, and is finally positioned near the end of the frame that is remote from the racket shaf.

8. The invention defined in claim 5, wherein the inner metal member is tubular and has a solid metal insert located in a portion of its length, namely, at the end of the frame that is remote from the racket shaft; the particular length and mass or density of said solid insert being selected to impart the desired weight to the racket.

References Cited
UNITED STATES PATENTS

| | | | |
|---|---|---|---|
| 2,171,223 | 8/1939 | Robinson | 273—73 |
| 2,793,421 | 5/1957 | Brumbaugh | 29—163.5 X |
| 2,807,875 | 10/1957 | Snyder | 29—423 |
| 2,861,326 | 11/1958 | Bergstrom | 29—163.5 |
| 3,015,884 | 1/1962 | Chamberlain | 29—423 |
| 3,108,371 | 10/1963 | Munse | 72—335 |

THOMAS H. EAGER, *Primary Examiner.*

U.S. Cl. X.R.

29—163.5; 72—335; 273—73